United States Patent [19]

Celtruda et al.

[11] 3,771,138

[45] Nov. 6, 1973

[54] APPARATUS AND METHOD FOR SERIALIZING INSTRUCTIONS FROM TWO INDEPENDENT INSTRUCTION STREAMS

[75] Inventors: Joseph Orazio Celtruda; William Russell Crosthwait; John Goodell Earle, all of Gaithersburg; John Wenard Fennel, Jr., Beltsville; Roy Francis Henderson, Gaithersburg, all of Md.

[73] Assignee: International Business Machines Corporation, Armonk, N.Y.

[22] Filed: Aug. 31, 1971

[21] Appl. No.: 176,495

[52] U.S. Cl. .......... 340/172.5

[51] Int. Cl. .......... G06f 9/18

[58] Field of Search .......... 340/172.5

[56] References Cited

UNITED STATES PATENTS

| | | | |
|---|---|---|---|
| 3,373,408 | 3/1968 | Ling | 340/172.5 |
| 3,548,384 | 12/1970 | Barton et al. | 340/172.5 |
| 3,573,851 | 4/1971 | Watson et al. | 340/172.5 |
| 3,601,812 | 8/1971 | Weisbecker | 340/172.5 |
| 3,585,600 | 6/1971 | Saltini | 340/172.5 |

*Primary Examiner*—Gareth D. Shaw
*Assistant Examiner*—Paul R. Woods
*Attorney*—J. Jancin, Jr. et al.

[57] ABSTRACT

In a pipelined processing unit of a digital computer, an apparatus for sharing the processing capability of the computer between two independent instruction streams is disclosed. The apparatus includes a buffer for instructions of each of the independent instruction streams. These buffers are connected to a selection means which samples various machine resources and determines which instruction of the two independent instruction streams is to be executed next.

3 Claims, 6 Drawing Figures

INVENTORS
JOSEPH O. CELTRUDA
WILLIAM R. CROSTHWAIT
JOHN G. EARLE
JOHN W. FENNEL, JR.
ROY F. HENDERSON
BY J. Jancin Jr.
ATTORNEY

APPARATUS AND METHOD FOR SERIALIZING INSTRUCTIONS FROM TWO INDEPENDENT INSTRUCTION STREAMS

RELATED APPLICATION

This patent application is related to the application Ser. No. 176,494 entitled "Instruction Selection in a Two-Program Counter Instruction Unit" by John W. Fennel, Jr. and assigned to the same assignee as the present application. This patent application presents the approach of instruction selection where for each instruction, a prediction is made to see where the instruction can be processed. The processable instructions are then selected according to the preestablished priorities. In the related application, the instructions are tried on an alternating basis until one instruction from one instruction stream fails to be processed. Then further processing for the failing instruction stream is stopped until the reason that caused the instruction to fail ceases. Then alternate processing resumes.

BACKGROUND OF THE INVENTION

This invention relates generally to the field of digital computers and more specifically, to the field of high performance digital computers.

In the field of high performance digital computation, there have been many techniques developed for improving the speed at which a computer can execute instructions. One approach to improving computer performance has been to optimize the system architecture in order to achieve this objective. The computer system shown in U.S. Pat. No. 3,400,371 is an example of this particular approach to performance improvement.

Another improvement has been an architecture change in which the traditional storage function is divided amongst two different kinds of storage elements: a slow speed high capacity storage and a high speed small capacity storage. In such a system, the computer would attempt to operate all instructions utilizing data from within the high speed low capacity storage. Since the speed of the low capacity storage is designed to be very high and commensurate with processing speeds within the computer, instructions necessitating data from within the storage can be processed at very high speeds provided the data required is found within the high speed low capacity storage unit. When the data is not available in the high speed low capacity storage unit, a block of data must be fetched from the main storage unit to the high speed low capacity storage unit. With proper programming, the necessity of fetching blocks from the low speed high capacity storage (main storage) to the high speed low capacity storage (cache) is reduced to a low level so that the overall system performs efficiently as compared to the conventional approach which customarily employs a single relatively slow speed storage unit.

Another advanced approach to improving the speed at which computers can process instructions has been the development of the pipelined processor. These processors can perform many instructions at very high speeds because the internal organization has been deisgned so as to optimize the number of instructions that can be performed over a period of time. A pipelined processor actually performs certain operations on several different instructions simultaneously. For example, one instruction might call for an operation upon two operands contained within the main memory.

These operands might be fetched from main memory during the same period of time that a second instruction was being decoded to determine its type as well as its data requirements. Still a third instruction might be nearing its completion, all in the same machine cycle.

Although the pipelined processor is highly efficient as compared to other data processors, the pipelined data processor has an inherent problem which prevents maximum utilization of the data processing capability. Due to program dependencies, even a pipelined processor can be put into a waiting state while data is fetched from a memory. During these wait periods, even a pipelined processor cannot utilize all of the available processing capability. Branch instructions are another form of bottle neck within a normal program and do have a significant effect upon the processing capability of even a pipelined processor.

In light of the above identified problem within piplined data processor, it is a primary object of this invention to produce a pipelined processor which is more efficient than previous pipeline processor.

It is a further object of this invention to increase the efficiency of pipeline processors without substantially increasing the hardware cost.

It is a further object of this invention to produce a pipeline processor which is capable of operating upon two instruction streams simultaneously and achieve the simultaneous operation at no significant increase in cost.

It is still a further object of this invention to produce a pipeline processor which is capable of operating upon instructions from two independent instruction streams at a combined processing rate approximating twice the data processing rate of a similar pipeline processor which was designed to perform instructions in a single instruction stream.

SUMMARY OF THE INVENTION

The above identified objects and features of the present invention are achieved through the unique selection circuitry operated in accordance with a selection algorithm so as to select instructions from two independent instruction streams and merge the processing of the selected instructions from the two independent instruction streams (I-Streams) into a pipeline processor. The method of selecting instructions involve a predecode cycle in which various tests are performed upon the instructions within indepenent instruction streams. The tests performed in the pre-decode area consider whether capability for the particular instruction would be available as well as other interlock checks which depend upon the status of the machine and relate to whether the pipelined processor would process the next instruction for each instruction stream. The pre-decode must also insure that no one instruction stream can monopolize the processing resources of the system. Once the pre-decode cycle is completed and an instruction is selected, the instruction is passed to the I register in which certain initial phases of the processing for the instructions selected are performed. In addition, further checks for specific availability for general purpose registers etc. are made while the instruction resides in the I register. Following the completion of all of the operations involved with processing instructions within the I register, the instruction is passed on to additional staging hardware which is used to insure that an instruction will be presented to the instruction processing unit connected to the staging unit so that one instruction will enter the pipeline processor during each basic machine cycle of the pipeline processor.

The foregoing and other objects, features and advantages of the invention will be apparent from the following, more particular description of the preferred embodiment of the invention as illustrated in the accompanying drawings.

Figure 3A:
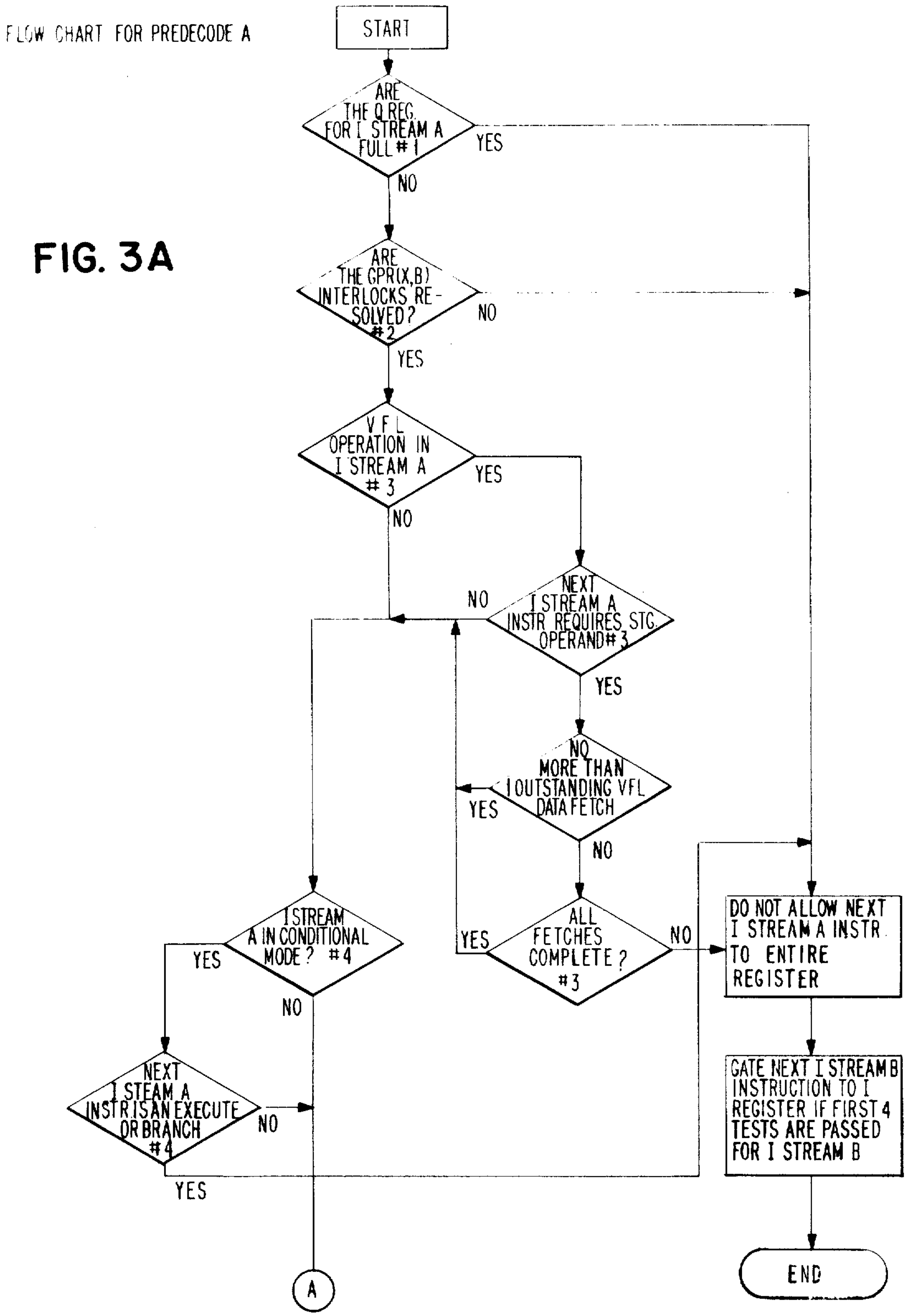
Figure 3B:
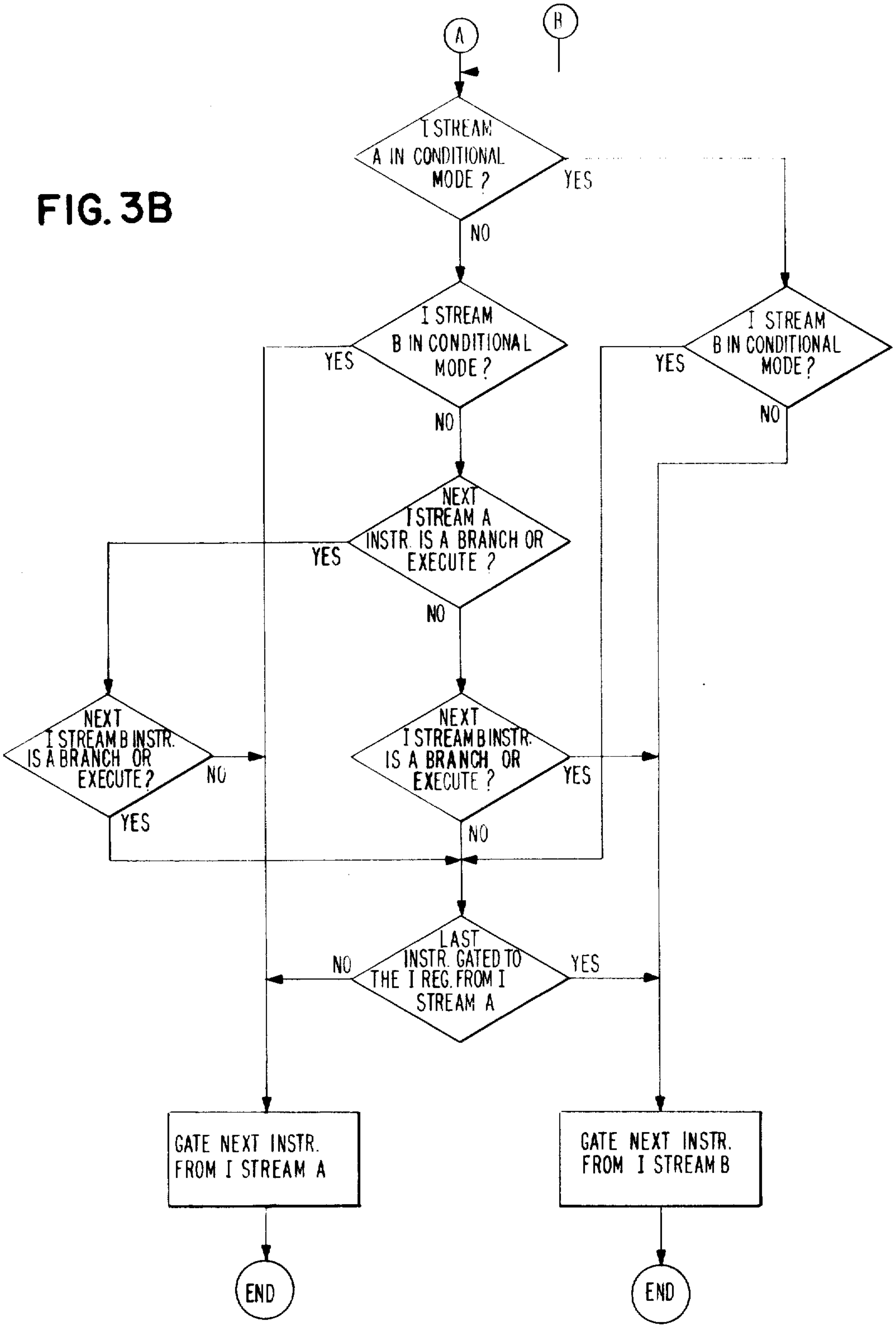

FIGS. 3*a* and 3*b* show a flow chart for the predecode function.

Figure 4A:
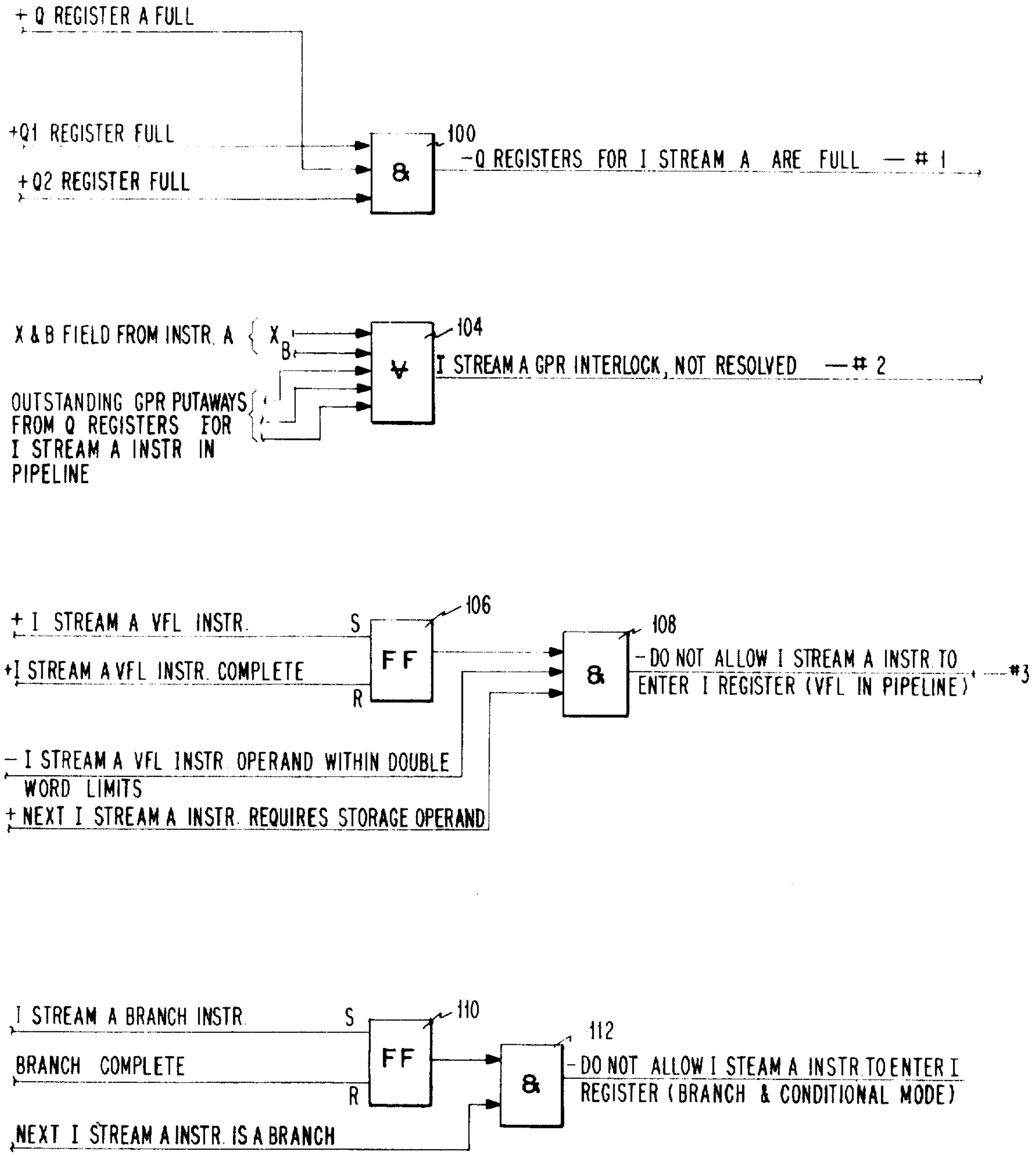
Figure 4B:
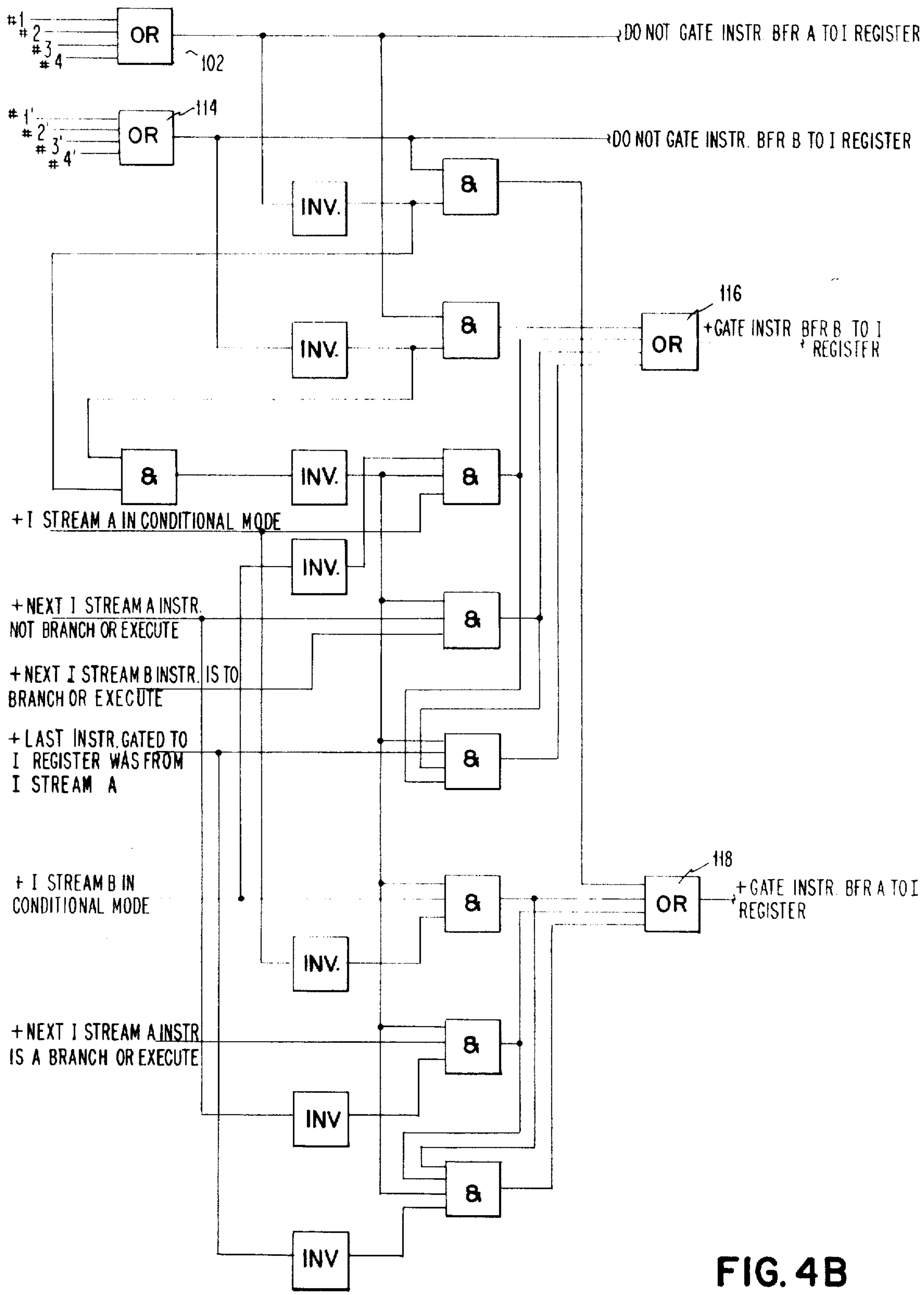

FIGS. 4*a* and 4*b* show the circuitry necessary to generate the gating signals necessary to complete the predecode function.

DETAILED DESCRIPTION

Figure 1:
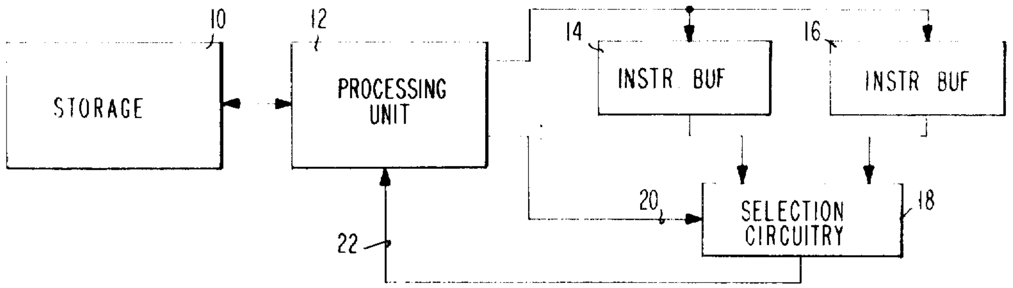
FIG. 1 shows an overall system diagram which embodies the present invention.

Referring now to FIG. 1, a schematic drawing is shown which embodies the present invention. In the computer system as shown in FIG. 1, there is a storage unit 10 interconnected with a processing unit 12. The storage unit 10 could be a core storage unit similar to that found in many current data processors. The storage unit could also be any other form of high speed storage such as a monolithic storage or even some form of directly addressable bulk storage. The processing unit 12 consists of a data processor which is capable of interpreting and performing instructions in machine language which are presented to the processing unit 12 on data bus 22. Such a processor could be any IBM System/360 computer wherein the modifications of the present invention have been embodied into such machines. These modifications would affect the instruction register function within such a machine.

The instruction register function of the system shown in FIG. 1 employs two instruction buffers 14 and 16. Instruction buffer 14 is a standard instruction buffer as might be found in a System/360 machine in which the instruction stream (I-Stream) is a series of machine language instructions which correspond to a single unique program. A second instruction buffer 16 is also shown in FIG. 1 and this instruction buffer contains machine language instruction from a second independent instruction stream. A certain amount of unique hardware is contained within processing unit 12 for fetching from storage 10 the instructions of the two independent instruction streams. It is also important to note that this hardware must insure that the instructions from each of the independent instruction streams are transmitted only to the instruction buffer corresponding to that instruction stream.

Selection circuitry 18 is shown connected to the instruction buffers 14 and 16. The function of selection circuitry 18 is to select one machine language instruction from either instruction buffer 14 or instruction buffer 16 and transmit the selected instruction to processing unit 12 via data bus 22.

A data bus 20 is shown passing between processing unit 12 and selection circuitry 18. The purpose of data bus 20 is to pass certain information from the processing unit 12 to the selection circutry 18. The information that must be passed to selection circuitry 18 relates to the availability of processing resources within processing unit 12. In its simplest embodiment of the system shown in FIG. 1, data bus 20 would merely transmit information to selection circuitry 18 which would indicate that processing unit 12 had completed an instruction and was ready to receive another instruction. Such a simple approach would be found in systems where the processing unit was of the type typically found within machines of System/360. However, the present invention is much more advantageous in systems where processing unit 12 is of the so-called pipelined processing type. In a pipelined processor, more than one instruction can be in the process of being performed at any one instant. Such a processor can be thought of as a pipeline in which instructions and data enter at one end during one machine cycle and during the same machine cycle the results of previous instructions to enter the pipeline processor would exit. Also, during the same cycle time, processing would be performed in the pipeline processor upon other instructions which had entered the pipeline processor in previous cycles but had not yet been completed.

In a system characterisized by FIG. 1 wherein processing unit 12 is a pipeline processor, the communications between selection circuitry 18 and processing unit 12 along data bus 20 becomes more complicated than in the previously discussed embodiment. In normal programs, there are often data dependencies between two successive instructions. That is, the answer generated by one instruction is required as input data to a successive instruction. Such dependencies might be referred to as interlocks and, in a pipelined processor, it might be necessary that the first insturction be completely processed before a second instruction in the same data stream could be allowed to enter the processing unit. Thus, selection circuitry 18 is required to determine which instruction among the two instructions in the instruction buffers 14 and 16 can be transmitted along data bus 22 to processing unit 12 during any one instruction cycle.

Figure 2:
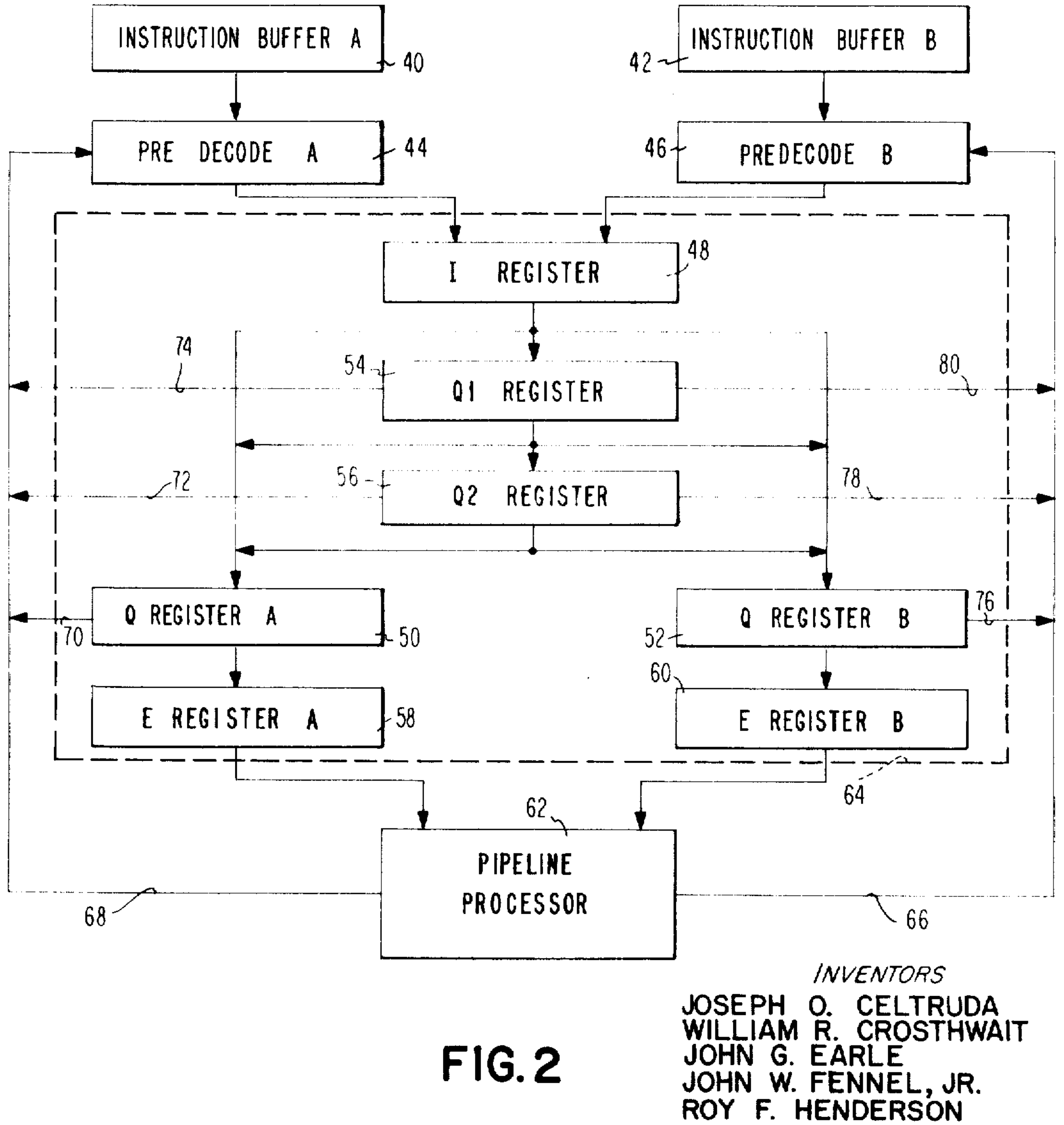
FIG. 2 shows a preferred embodiment of the present invention and shows the overall structure of the system hardware for merging instructions from two independent I-Streams into a pipeline processor.

Since a pipelined processor is a very complicated data processing unit, designing a system with a pipelined processor capable of processing instructions simultaneously from two different instruction streams requires a certain amount of sophisticated hardware to perform the buffer and selection function as shown schematically in FIG. 1. FIG. 2 shows, in more detail, the required circuitry to perform the instruction interleaving function which is required in order to share the pipelined processor between the two instruction streams.

In FIG. 2 there are two instruction buffers 40 and 42. These buffers correspond to hardware registers in which at least one instruction from two independent instruction streams can be buffered. Instruction stream A would have its machine language instruction buffered in instruction buffer 40; and likewise, instruction buffer 42 would store the machine language instruction for instruction stream B. Instruction buffer 40 and instruction buffer 42 have attached thereto, although it is not shown, certain hardware for insuring that instructions are fetched from main storage as required so that each instruction buffer will always have an instruction for each independent instruction stream for processing.

Attached to the instruction buffers in FIG. 2 are predecode A and pre-decode B which are labeled 44 and 46. The pre-decode function is one which examines the type of instruction which is stored within the instruction buffer attached thereto and determines whether that instruction would be successfully performed if it were passed on to instruction register 48.

To more fully understand the pre-decode function, reference should be made to FIGS. *3a* and *3b* wherein a flow chart of the pre-decode function is shown. The first function of each pre-decode unit is to examine whether the Q registers for the given I-Stream are full of previously examined and partially processed instructions. The Q registers are shown in FIG. 2 and will be discussed later. If it is found that the Q registers for a given instruction stream are full, no further instructions from that particular instruction stream can be allowed to pass from either instruction buffer 40 or 42 into the I register 48 of FIG. 2.

The second test that must be performed by each predecode function is whether the general purpose register addressing interlocks have been solved. This test relates to the program data dependency based on the X and B fields used in address calculations. That is, whether one instruction's address calculation depends upon data developed by a preceding instruction. If this is the case, a succeeding instruction cannot be allowed to enter the processing pipeline until such time as the preceding instruction has modified the general purpose register which is used by the succeeding instruction. When the general purpose register (GPR) addressing interlocks (X, B interlocks) have not been resolved, an instruction cannot be gated from the instruction buffer to the I register.

A third test that must be performed in the pre-decode function relates to fetches of data from main memory by preceding instructions. Since a pipeline processor is normally a very fast data processing unit as compared to the speed of the storage, an instruction which requires data from main storage might force a delay in the processing of instructions in that particular instruction stream. It is quite commonly the case that a variable field length (VFL) instruction will require a number of data fetches. Thus, the pre-decode function must determine whether there has been a previously initiated VFL instruction. If there has been a previously initiated VFL instruction in a given instruction stream, the next instruction within that particular instruction stream must be investigated to see whether it requires a storage operand. A storage operand would be some data that resides in main storage. If the instruction does not require a storage operand, the thrid test of the predecode function will be met and the next instruction in that particular data stream might be available for gating to the I register, assuming all the other tests have been met. However, if the instruction in the given I-stream contains one requiring a storage operand and a previous instruction was a VFL instruction which had not been completed, the third test would require a further investigation into whether more than one data fetch is outstanding for the previously issued VFL instruction. The reason for the third test is an attempt to make sure that main memory fetches for a given I-Stream are handled in sequence because fetching of various data words out of sequence would tend to slow the processing of a given I-Stream.

The fourth test that is performed by the pre-decode is whether a given I-Stream is in conditional mode. Conditional mode is indicated by the presence of a branch or an execute instruction. When either a branch or execute instruction is encountered in the stream of instructions, the conditional mode register for the given I-Stream would be set. When the conditional mode register for an I-Stream is set, no more branch or execute instructions can be executed for that particular I-Stream until the previously initiated branch or execute instruction has been completed.

Each of the above four test must be performed for each of the two independent I-Streams. In situations where one of the four tests fails for each of the two I-Streams, no instruction is passed from the instruction buffers to the I register during a given cycle. During the next pre-decode cycle, the same tests are again performed and it is possible that an instruction might subsequently be gated from the instruction buffer to the I register as the conditions in each of the four tests outlined so far are dynamic and these conditions will change as the status of the pipeline processor changes for the given I-Stream.

It is possible that the four tests for one I-Stream might pass while the second I-Stream might fail one or more of the four tests. In this situation, the I-Stream for which the four tests have passed would have its instruction gated from the instruction buffer into the I register. When the instructions for both independent I-Streams pass the four previously outlined tests, additional testing must take place. This additional testing is shown in flow-chart form in FIG. *3b*. At the top are shown two entrance points A and B. These symbolize the fact that all four tests have been passed successfully by the two independent I-Streams A and B.

While four tests have been specifically outlined above, many more or less tests could be involved. The number and type of test is a matter of design of the pipelined processor and its processing resources. The larger the number of operations that can be performed independently, the more independent checks that must be performed and vice versa. No matter what checks are performed, however, their purpose is to determine whether an instruction will be processed if it is gated into the I register (the first position of instructions in the pipeline processor). All such necessary tests must be performed in the pre-decode area.

Once the first four tests have been met for both data streams, the first joint test involving both instruction streams is a test relating to conditional mode. If one I-Stream is in conditional mode and the other I-Stream is not, the I-Stream which is not in conditional mode will be the one for which the instruction will be gated from the instruction buffer to the I register.

If both instruction streams have their conditional mode set, then a further test must be performed which determines which instruction stream had an instruction gated to the I register in the preceding cycle. If instruction stream A had an instruction previously gated to the I register in the preceding cycle and both I-Streams were in conditional mode, the next instruction to be gated to the I register would be from I-Stream B. This type of gating represents an alternating algorithm which requires instructions to be alternated amongst the two I-Streams in cases where all other tests fail to resolve the decision of which instruction will be gated next to the I register.

In FIG. *3b* it will be seen that when both instruction streams are not in conditional mode, the next test is one which determines whether the next instruction in each I-Stream is either a branch or execute instruction.

Where all preceding tests have failed to select which instruction is next, the I-Stream which has a branch or execute instruction in it will be the I-Stream for which the instruction will be gated from the instruction buffer to the I register. Again, where both instruction streams have branch or execute instructions pending in the respective instruction buffers, an alternating algorithm is applied.

In the case where all other tests fail to resolve which I-Stream will have its instruction gated to the I register from the instruction buffers, an alternating algorithm is employed. The alternating algorithm is used principally to insure that no one instruction stream can monopolize the processing unit and prevent instructions from the other I-Stream from being processed at all.

Referring now to FIG. 4*a*, certain actual hardware logic is shown which is used in the pre-decode unit. AND circuit 100 is utilized in performing the first test of the pre-decode function for I-Stream A. There are three input signals shown to AND circuit 100. The first signal is an indication whether Q register A 50 of FIG. 2 is full. It will later be shown that all instructions for instruction stream A pass through Q register A 50. The second signal input to AND circuit 100 of FIG. 4*a* is a signal which indicates whether Q I register 54 is full. The third input to an indication of whether Q 2, register 56 is also full. In the situation where a positve signal appears at each of the inputs of AND circuit 100, the output of AND circuit 100 is a negative signal. When a positive signal on each of the inputs denotes that the respective Q register is full, the negative output of AND circuit 100 indicates that all of the Q registers for the I-Stream are full and that test number 1 has failed. A negative signal would thus be transmitted to output number 1 on FIG. 4a which becomes input number 1 on FIG. 4b to OR circuit 102. The output of OR circuit 102 will be positive when any of the four inputs are negative. A positive output to OR circuit 102 is used to denote that instruction buffer A should not be gated to the I register.

The second test performed for each of the I-Streams in the pre-decode area is the general pupose register (X, B field) interlocks. In this particular check, the general purpose registers which will be stored into by previously executed instructions already in the pipeline are compared with the general purpose register which would be used for addressing by the instruction currently contained within the instruction buffer. This test is shown diagrammatically as using EXCLUSIVE OR element 104. The X and B fields of the instruction in I-Stream A are shown entering EXCLUSIVE OR element 104. These fields are used in the address calculations of the general purpose register which will be changed by the execution of the instruction currently residing in instruction buffer A. The outstanding GPR putaways from the Q registers are also shown entering EXCLUSIVE OR element 104. These bits represent the addresses of general purpose registers for instruction stream A which will be changed by instructions already in the pipeline. When there is an exact comparison between the general purpose register addresses contained within the instruction in the instruction buffer and the general purpose register address which will be changed by an instruction already initiated, the instruction in the instruction buffer for the I-Stream having this condition should not be executed. This condition would be indicated by the exact comparison between these addresses and would show up as a negative signal at the output of EXCLUSIVE OR 104. This negative signal would be passed on to OR circuit 102 in FIG. 4*b* and is used to generate a signal which would prevent the gating of instructions from instruction buffer A to the I register. This test is required to ensure that the instruction residing within the instruction buffer uses the correct data in the general purpose register used by the instruction. This is accomplished by making sure that all the changes to the data in that general purpose register have been completed prior to the initiation of the instruction in the instruction buffer.

The third test performed in pre-decode is accomplished by the use of flip-flop 106 and AND circuit 108. The output of flip-flop 106 has a positive level when it has been set and indicates that I-Stream A has a VFL insturction already initiated. AND circuit 108 operates in the same manner as AND circuit 100 and will generate a minus signal when the proper input conditions are met. This implies that there has been a VFL instruction initiated for I-Stream A, that the VFL instruction initiated has operands not within double word limits and that the next instruction in I-Stream A requires a storage operand. When all these conditions are met, test number 3 fails and an output of AND circuit 108 is negative which will prevent the gating of instruction buffer A to the I register.

Test number 4 is performed by flip-flop 110 and AND circuit 112. Flip-flop 110 is set when I-Stream A encounters a branch instruction, i.e., I-Stream A in conditional mode. The output of flip-flop 110 is positive when the flip-flop is set. By decoding the instruction code of the instruction in instruction buffer A, a signal can be generated which enters AND circuit 112 which will indicate whether the instruction contained within instruction buffer A is a branch instruction. When instruction Stream A is in conditional mode and the next instruction in instruction buffer A is a branch instruction, test number 4 fails and a minus signal appears at the output of AND circuit 112. This signal is also transmitted to OR circuit 102 in FIG. 4*b* and generates a signal which prevents the gating of the instruction in instruction buffer A to the I register.

The circuitry shown in FIG. 4*b* is designed principally to handle the first four test conditions for I - Stream A. An identical set of logic must also be present for I-Stream B and appropriate input signals indicated. In FIG. 4*b*, the inputs for the 4 tests for I-Stream B are shown as 1', 2', 3' and 4'. These inputs enter OR circuit 114 whose output will be positive whenever any input is negative. In addition, whenever the output of OR circuit 114 is positive, the instruction contained in instruction buffer B will not be gated to the I register.

The remainder of the circuitry in FIG. 4*b* has the same logical characteristics of the AND circuits and OR circuits described in connection with FIG. 4*a*. In addition, certain additional interactive inputs from the plipeline processor are shown entering at the left hand side of FIG. 4*b*. These inputs have positive levels whenever the condition labeled on each input line is true. The circuitry in FIG. 4*b* generates at the output of OR circuit 116 a signal which will enable instruction buffer B to be gated to the I register in accordance with all of the tests described in the flow charts of FIGS. 3a and 3b. The same applies for the output of OR circuit 118 which will generate a signal for gating the instruction in instruction buffer A to the I register.

Referring again to FIG. 2, the I register 48 is shown as receiving information from each of the pre-decode circuits 44 and 46. In actuality, the pre-decode circuits generate signals for gating the instruction buffered either in instruction buffer A 40 or the instruction buffered in instruction buffer B 42.

The function of the I register is that of beginning the execution phase of the instruction selected by the predecode circuitry. The I register 48 can, therefore, be considered as the first position in the pipeline processor through which an instruction must pass as the instruction is executed.

If the instruction residing in the I register requires an address calculation, the required access to the general purpose register is made for the instruction in the I register. Before the address calculation is made, however, the availability of an address register and operand buffers must be assured and these resources allocated to the operation of the instruction. In addition to resource allocation, while the instruction resides in the I register, the instruction is checked for validity and the general purpose register address fields are checked to determine whether they meet the restrictions dictated by the particular operation code of the instruction. If an exception should be detected, the particular I-Stream is interrupted and an invalid instruction is indicated. The checking outlined above is done by external hardware which is not shown but which is connected directly to the I register. These checks are performed by hardware which is essentially the same as the checking hardware within System/360 machines.

Once the checks have been performemd in the I register 48, the instruction passes into the Q registers which comprise Q 1 register 54, Q 2 register 56, Q register 50 and Q register B 52. The Q registers acts as intermediate buffers for the instructions of the different I-Streams and act as temporary storage places for these instructions while the pipeline processor is being made ready for processing the instruction. As the instructions leave I register 48 they can go to any of three places: namely Q 1 register 54, Q register A 50 and Q register B 52. If the instruction is an instruction from I-Stream A, the instruction can only go to either Q 1 register 54 or Q register A 50 while if the instruction is from the instruction stream B, it may go to the Q 1 register 54 or Q register B 52. In any case, each instruction from I-Stream A must spend at least one cycle in Q register A 50 while each instruction from I-Stream B must spend at least one cycle in Q register B 52.

When an instruction is found in Q register A 50, for example, the instruction is subjected to a general purpose register validity check, a check to confirm whether the processor is seeking the operands from storage which are required to process the instruction. A similar simultaneous check is performed in Q register B 52 for any instruction residing therein. If these checks are passed, the instruction will be passed during the next cycle onto the E register associated with the particular Q register.

Under certain circumstances, the checks made in the Q register for particular I-Stream might not pass. Thus, the instruction residing in Q register A 50, for example, might not be allowed to pass onto E register A 58. This would mean that if the I register 48 contained an instruction from I-Stream A, the instruction would have to pass from I register 48 to Q 1 register 54 because Q register A 50 contained an instruction not yet processed. At the same time, if there had been an instruction residing in the Q 1 register 54, the instruction would have to pass onto Q 2 register 56. If the instruction in Q 1 register were an instruction from I-Stream B, it might pass from Q 1 register 54 to Q register B 52 if Q register B 52 were empty.

Q register 54 and Q 2 register 56 serve as intermediate buffers between I register 48 and Q register and Q register A 50 and Q register B 52. The gating busses shown in FIG. 2 suggest that Q 1 register 54 and Q 2 register 56 can be gated to Q register A 50 or Q register B 52. This gating, however, can only occur when either Q register A 50 or Q register B 52 are empty and that the instruction being gated from either Q 1 register 54 or Q 2 register 56 is of the proper I-Stream. The gating circuitry is further designed so that the instructions in a given instruction stream are not processed out of order. Although the actual gating circuitry is not shown, the functions are adequately described that any skilled digital engineer can design the controls to control the Q registers as described.

Once the instruction reaches the E register (execution), only a few checks remain before the instruction is processed by the pipeline processor 62. If an instruction requiring a storage operand is gated into the E register, a check will be made to insure that the operand is available. If the check fails, the pipeline processor has been unable to fetch the data and processing of that particular instruction stream must be discontinued until the fetch has been completed. If the check indicates that the storage operand is available, the operand is gated to the working registers in the pipeline processor. In addition, any general purpose register accesses are made while the instruction resides in the E register. Once these checks and operations are complete, the instruction is ready for immediate processing in the pipeline processor 62. Under certain circumstances, an instruction residing in E register A 58 and E register B 60 may be processed simultaneously by the pipeline processor if there is sufficient parallel capacity to do so. This parallel capacity is a matter of design for a particular pipeline processor and will not be discussed here as it is not part of the present invention. Under normal circumstances, however, instructions ready for processing from E register 58 and E register B 60 will be processed alternately. Only under conditions where the instruction fails to pass the checks performed in the E register will two or more instructions be processed in successive machine cycles by the pipeline processor 62 from a single E register.

While the invention has been particularly shown and described with reference to the preferred embodiment thereof, it will be understood by those skilled in the art that various changes in form and details may be made therein without departing from the spirit and scope of the invention.

What is claimed is:

1. In a computer system containing a main storage interconnected with an instruction processing unit, an instruction selection apparatus comprising:

a first and second instruction buffer for storing at least one instruction in each buffer, each buffer storing instructions from only one of two independent instruction streams;

two interrogation means each connected to said instruction processor and to single unique instruction buffer for interrogating the available processor resources and determining for the instruction in the connected instruction buffer if the resources are available to process the instruction in said connected instruction buffer, said interrogating means producing a signal indicative of processing resources availability for said connected instruction buffer; and a gating means responsive to said signal from each of said two interrogation means and also connected to said instruction buffers and said instruction processor, said gating means operational to gate the indicated instruction from said two instruction buffers to said instruction processor if only one instruction is indicated processable by said interrogation means, or to alternately gate said instructions commencing with the instruction from the stream that was not gated on the next preceeding cycle if both instructions are indicated processable by said interrogating means . . . thereby accomplishing simultaneous processing of the two independent instruction streams.

2. In a computer system containing a main storage interconnected with an instruction processor, an instruction selection apparatus comprising:

a first and second instruction buffer for storing at least one instruction in each buffer, each buffer storing instructions from only one of two independent instruction streams;

two interrogation means each connected to said instruction processor and to a single unique instruction buffer for interrogating the availability processor resources and determining for the instruction in the connected instruction buffer if the resources are available to process the instruction in said connected instruction buffer, said interrogation means producing a signal indicative of processing resources availability for the instruction in said connected instruction buffer; and gating means responsive to said signal from each of said two interrogation means and also connected to said instruction buffers and said instruction processor, said gating means operational to 1. gate no instruction from instruction buffers to said instruction processor when no signals are received from either of said two interrogation means
2. gate the instruction from the instruction buffer to the instruction processor for which there is a signal received from said interrogation means when only one interrogation means is sending a signal to said gating means
3. gate the instruction which is either a branch or an execute to said processor when both said interrogation means sends said signal to said gating means
4. gate instructions alternatively from said instruction buffers to said instruction processor when all other gating resolution test fail to decide which instruction should be gated next.

3. A method of selecting instructions from two independent instruction streams for processing in an instruction processor comprising the steps of:

interrogation for the next instruction in each of said two independent instruction streams the availability of processing resources in the instruction processor;

producing the availability indication for each instruction for which the available processing resources are sufficient that the instruction can be processed;

gating no instruction to the instruction processor if there is no availability indication for either instruction stream;

gating the instruction associated with the availability indication to the instruction processor if there is only one availability indication;

gating the instruction which is a branch or execute instruction to the instruction processor if only one instruction in said two independent instruction streams is a branch or execute instruction and if there are two availability indications;

gating the instructions from the instruction stream which was not gated in the next preceding gating cycle when the preceding gating steps are ineffective to determine the next instruction from the two independent instruction streams; and repeating the preceding operations until all instructions in each independent instruction streams are gated to the instruction processor.

* * * * *